United States Patent
Shiren et al.

(10) Patent No.: US 9,243,179 B2
(45) Date of Patent: Jan. 26, 2016

(54) REACTION MATERIAL AND CHEMICAL HEAT PUMP

(71) Applicants: Yohei Shiren, Tokyo (JP); Masahiro Masuzawa, Kanagawa (JP); Hiroko Ohkura, Kanagawa (JP); Yasutomo Aman, Kanagawa (JP); Yoshifumi Ohba, Kanagawa (JP)

(72) Inventors: Yohei Shiren, Tokyo (JP); Masahiro Masuzawa, Kanagawa (JP); Hiroko Ohkura, Kanagawa (JP); Yasutomo Aman, Kanagawa (JP); Yoshifumi Ohba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 98 days.

(21) Appl. No.: 14/180,426

(22) Filed: Feb. 14, 2014

(65) Prior Publication Data

US 2014/0231698 A1    Aug. 21, 2014

(30) Foreign Application Priority Data

Feb. 18, 2013 (JP) .................................. 2013-029185
Dec. 27, 2013 (JP) .................................. 2013-272520

(51) Int. Cl.
*C09K 5/16* (2006.01)
*F28D 20/00* (2006.01)
*F28D 20/02* (2006.01)
*F25B 17/08* (2006.01)

(52) U.S. Cl.
CPC . *C09K 5/16* (2013.01); *F25B 17/08* (2013.01); *F28D 20/003* (2013.01); *F28D 20/021* (2013.01); *F28D 20/023* (2013.01); *Y02E 60/142* (2013.01); *Y02E 60/145* (2013.01)

(58) Field of Classification Search
CPC ............... C09K 5/16; C09K 5/12; C09K 5/20
USPC ........................................... 252/71; 422/187
See application file for complete search history.

(56) References Cited

U.S. PATENT DOCUMENTS

| | | | | |
|---|---|---|---|---|
| 2008/0203891 A1* | 8/2008 | Gaertner | ................. | C02F 1/325 313/486 |
| 2009/0020264 A1* | 1/2009 | Morita | ................... | C09K 5/063 165/104.12 |
| 2009/0294094 A1* | 12/2009 | Suzuki | ................. | F28D 20/023 165/10 |
| 2010/0186822 A1 | 7/2010 | Pan et al. | | |
| 2014/0231698 A1* | 8/2014 | Shiren | ...................... | C09K 5/16 252/71 |
| 2015/0034153 A1 | 2/2015 | Sato et al. | | |

FOREIGN PATENT DOCUMENTS

| | | | | |
|---|---|---|---|---|
| ES | WO 2008000855 A1 * | 1/2008 | ............ | C04B 18/021 |
| JP | 60-042563 | 3/1985 | | |
| JP | 60-050362 | 3/1985 | | |
| JP | 9-026225 | 1/1997 | | |
| JP | 2007-115916 | 5/2007 | | |
| JP | 2010-185035 | 8/2010 | | |
| JP | 2010-230268 | 10/2010 | | |
| JP | 2011-163730 | 8/2011 | | |
| JP | 2012-516578 | 7/2012 | | |
| JP | 2012-145252 | 8/2012 | | |
| JP | 2012220165 A * | 11/2012 | | |
| JP | 2013-195022 | 9/2013 | | |
| JP | 2013195022 A * | 9/2013 | | |
| JP | 2014-199915 | 10/2014 | | |
| JP | 2015-038952 | 2/2015 | | |
| WO | 2014/142340 A1 | 9/2014 | | |

OTHER PUBLICATIONS

Masakazu Sugiyama et al., "High-efficiency quantum structure tandem solar cells", Oyo Buturi, vol. 79, No. 5, 2010, pp. 435-439.
B.E. Sagol et al. "Lifetime and performance of InGaAsP and InGaAs absorbers for low bandgap tandem solar cells", Photovoltaic Specialists Conference (PVSC), 2009 34th IEEE, pp. 001090-001093.

* cited by examiner

*Primary Examiner* — Mark Eashoo
*Assistant Examiner* — M. Reza Asdjodi
(74) *Attorney, Agent, or Firm* — Cooper & Dunham LLP

(57) ABSTRACT

A reaction material for a chemical heat pump includes type III anhydrous gypsum, a magnesium compound, and $Ca_xMg_{1-x}SO_4$. The reaction material for the chemical heat pump structurally changes between a compound including type III anhydrous gypsum, the magnesium compound, and $Ca_xMg_{1-x}SO_4$, and a compound including hemihydrate gypsum, a hydrate of the magnesium compound, and a hydrate of $Ca_xMg_{1-x}SO_4$ when subjected to heat storage process and heat release process. x is $0<x<1$.

5 Claims, 9 Drawing Sheets

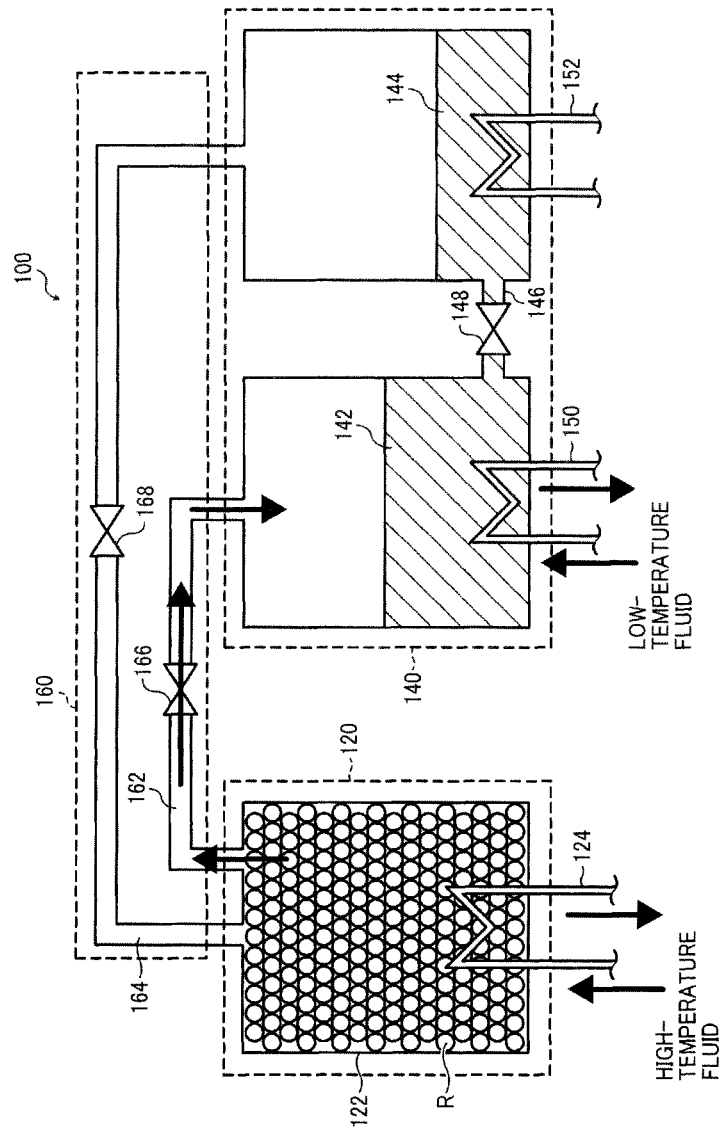

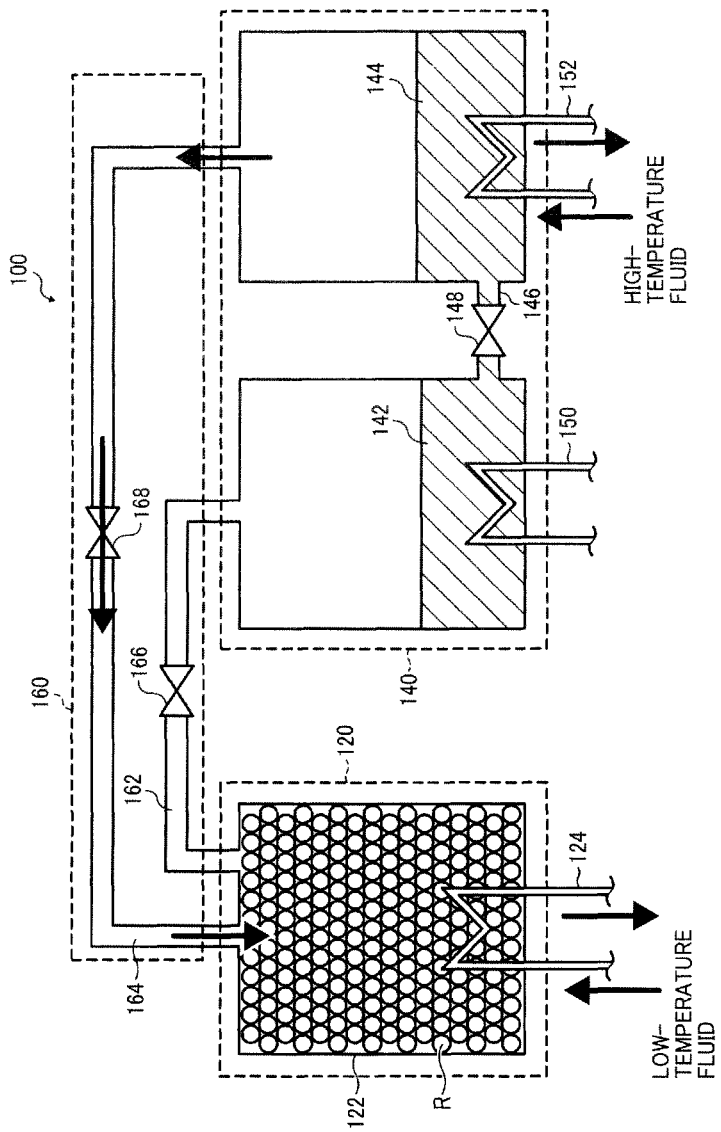

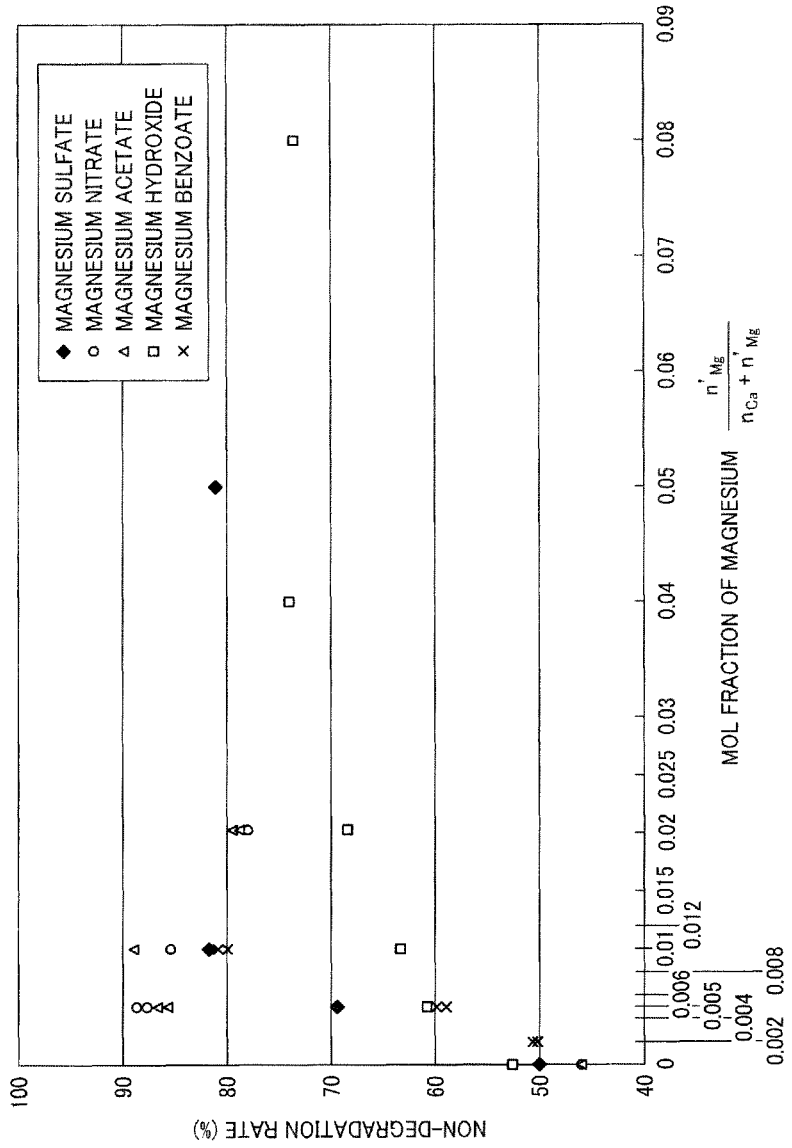

FIG. 4
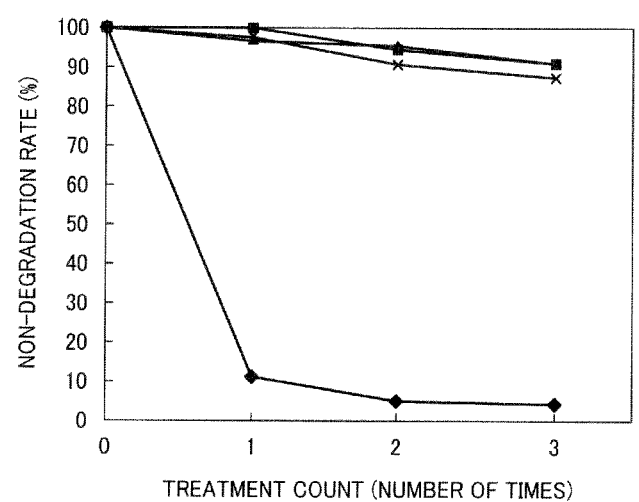
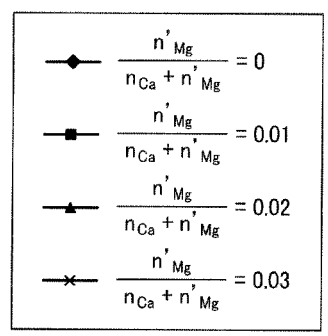

REACTION MATERIAL AND CHEMICAL HEAT PUMP

CROSS-REFERENCE TO RELATED APPLICATIONS

This patent application is based on and claims priority pursuant to 35 U.S.C. §119 from Japanese Patent Application No. 2013-029185, filed on Feb. 18, 2013, and 2013-272520, filed on Dec. 27, 2013, both in the Japan Patent Office, which are hereby incorporated by reference herein in its entirety.

BACKGROUND

1. Technical Field

Exemplary embodiments of the present disclosure generally relates to a reaction material and a chemical heat pump.

2. Related Art

In recent years, from the standpoint of energy conservation, heat recovery systems such as chemical heat pumps that effectively employ heat sources such as excessive exhaust heat are attracting attention.

Chemical heat pumps are systems that conduct supplying of heat and storage of heat employing exothermic and endothermic phenomenon accompanying reversible chemical reaction (hydration reaction and dehydration reaction) occurring between a reaction medium and a storage material (hereinafter referred to as reaction material). Typically, chemical heat pumps include a reactor including a heat exchanger having a reaction material reacting in a reversible manner with the reaction medium, an evaporator for evaporating a liquid reaction medium, a condenser for condensing a gaseous reaction medium, and an opening and closing mechanism that connects the reactor, evaporator, and condenser.

Specific materials as the reaction material for the chemical heat pump have been reviewed such as materials employing calcium oxide (CaO), materials employing magnesium oxide (MgO), and materials employing calcium sulfate ($CaSO_4$). Recently, among chemical heat pumps, a chemical heat pump employing calcium oxide or magnesium oxide as the reaction material is attracting attention. For example, see JP-2010-185035-A and JP-H9-026225-A. However, in a heat pump of either JP-2010-185035-A or JP-H9-026225-A, there is a problem of decline in reaction rate of the reaction material by repeating heat storage and heat release processes.

On the other hand, when calcium sulfate is employed as the reaction material, type III anhydrous gypsum (referred to as type III calcium sulfate) is employed from the standpoint of heat storage-release properties. In heat release process, reaction heat generated by reaction of type III calcium sulfate and the reaction medium is extracted. In heat storage process, an external heat such as excessive exhaust heat is added to calcium sulfate hemihydrate (calcined gypsum) and the reaction medium is desorbed.

However, a decline of reaction rate of the reaction material is also a problem when calcium sulfate is employed as the reaction material. The decline in reaction rate when calcium sulfate is employed as the reaction material is mainly due to phase change of crystal structure of calcium sulfate. More specifically, crystal structure of type III calcium sulfate changes to a more stable crystal structure of type II anhydrous gypsum (referred to as type II calcium sulfate) by repeating heat storage and heat release processes. Thus, there is a problem of decrease in heat storage amount and heat release amount.

SUMMARY

In view of the foregoing, in an aspect of this disclosure, there is provided a novel reaction material for a chemical heat pump including type III anhydrous gypsum, a magnesium compound, and $Ca_xMg_{1-x}SO_4$. The reaction material for the chemical heat pump structurally changes between a compound including type III anhydrous gypsum, the magnesium compound, and $Ca_xMg_{1-x}SO_4$, and a compound including hemihydrate gypsum, a hydrate of the magnesium compound, and a hydrate of $Ca_xMg_{1-x}SO_4$ when subjected to heat storage process and heat release process. x is $0<x<1$.

The aforementioned and other aspects, features, and advantages will be more fully apparent from the following detailed description of illustrative embodiments, the accompanying drawings, and associated claims.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 2A is a schematic view of an example of operation of the chemical heat pump according to an embodiment of the present invention in a heat storage process;

FIG. 2B is a schematic view of an example of operation of the chemical heat pump according to an embodiment of the present invention in a heat release process;

FIG. 3 is one example of a graph explaining degradation characteristics of reaction materials according to an embodiment of the present invention;

FIG. 4 is another example of a graph explaining degradation characteristics of reaction materials according to an embodiment of the present invention;

Figure 1:
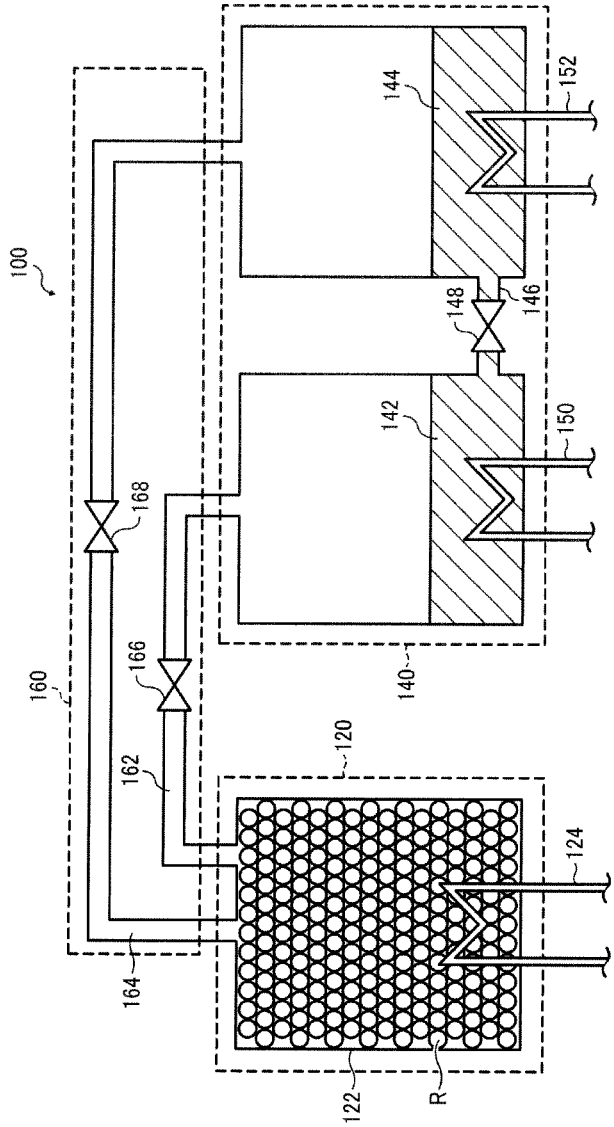
FIG. 1 is a schematic view of a configuration of one example of a chemical heat pump according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

Hereinafter, exemplary embodiments of the present invention are described in detail with reference to the drawings. However, the present invention is not limited to the exemplary embodiments described below, but can be modified and improved within the scope of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

In view of the foregoing, in an aspect of this disclosure, there is provided a novel reaction material for a chemical heat pump able to suppress crystal structure change from type III calcium sulfate to type II calcium sulfate even when heat storage and heat release processes are repeated.

Referring now to the drawings, exemplary embodiments of a reaction material and a chemical heat pump of the present invention are described in detail below.

<Reaction Material and Reaction Medium>

The reaction material according to an embodiment of the present invention includes type III calcium sulfate ($CaSO_4$: type III anhydrous gypsum) serving as a main component and a magnesium compound, and is obtained by mixing and kneading type III calcium sulfate and the magnesium compound. The average composition of the reaction material according to an embodiment of the present invention calculated from prepared amount of raw material is expressed as $Ca_yMg_{1-y}SO_4$ (however, y is $0.5 \leq y < 1$). It is important to note that type III calcium sulfate included in the reaction material may be type IIIα calcium sulfate or type IIIβ calcium sulfate.

At least one part of calcium site of calcium sulfate of the reaction material according to an embodiment of the present invention is substituted with magnesium at manufacture. Details will be described later. Accordingly, the reaction material according to an embodiment of the present invention includes $Ca_xMg_{1-x}SO_4$ (however, x is $0 < x < 1$).

There is no restriction regarding mixing ratio of calcium sulfate and the magnesium compound as long as the main component (50 mol % or more) is calcium sulfate. Preferably, a mol amount $n'_{Mg}$ of magnesium with respect to a mol amount $n_{Ca}$ of calcium is within 10 mol %, more preferably a mol amount $n'_{Mg}$ of magnesium with respect to a mol amount $n_{Ca}$ of calcium is within 5 mol %.

In addition, there is no restriction regarding a reaction medium reacting in a reversible manner with the reaction material according to an embodiment of the present invention as long as the reaction medium reacts in a reversible manner with calcium sulfate serving as the main component. An example of the reaction medium is water vapor.

There is no restriction regarding the magnesium compound, however, preferably the magnesium compound includes one compound or more selected from a group of magnesium sulfate, magnesium nitrate, magnesium acetate, magnesium hydroxide, magnesium benzoate, magnesium chloride, magnesium bromide, and magnesium iodide.

In addition, in a manufacturing method of the reaction material described later, it is preferable that citric acid or a citric acid compound is added when mixing and kneading calcium sulfate and the magnesium compound. There is no restriction regarding the citric acid compound. For example, calcium citrate may be preferably employed as the citric acid compound. By adding citric acid or the citric acid compound to the reaction material, decline in reaction rate of the obtained reaction material is prevented even when exothermic and endothermic processes are repeated.

There is no restriction regarding addition amount of citric acid or the citric acid compound, however, preferably addition amount is in a range from approximately 0.01 mol % to approximately 1 mol %.

The above-described reaction material according to an embodiment of the present invention reacts with the reaction medium (water vapor) in a reversible manner by heat storage-release processes. The reaction material structurally changes between a compound including type III anhydrous gypsum, the magnesium compound, and $Ca_xMg_{1-x}SO_4$, and a compound including hemihydrate gypsum, a hydrate of the magnesium compound, and a hydrate of $Ca_xMg_{1-x}SO_4$. It is important to note that in this patent specification, "The reaction material structurally changes between a compound including type III anhydrous gypsum, the magnesium compound, and $Ca_xMg_{1-x}SO_4$, and a compound including hemihydrate gypsum, a hydrate of the magnesium compound, and a hydrate of $Ca_xMg_{1-x}SO_4$" indicates when a typical load of a reaction material for a heat pump known to those skilled in the art is applied to the reaction material according to an embodiment of the present invention, structural change of type III anhydrous gypsum (referred to as type III calcium sulfate) to type II anhydrous gypsum (referred to as type II calcium sulfate) is suppressed (or decreased).

A method of confirming whether structural change of type III anhydrous gypsum to type II anhydrous gypsum is suppressed (or decreased) is as follows.

For example, a load of a dehydration process of water vapor pressure of approximately 1.5 kPa applied for 30 minutes, and a hydration process of water vapor pressure of approximately 90 kPa applied for four hours is applied to the reaction material one time. Suppression of structural change to type II anhydrous gypsum may be determined when a mixture ratio of type II anhydrous gypsum is 1% or less, preferably 0.1%.

<Manufacturing Method of Reaction Material>

The manufacturing method of the reaction material according to an embodiment of the present invention includes a process (S100) of preparing a magnesium compound aqueous solution by mixing the magnesium compound to water, a process (S110) of mixing and kneading the magnesium compound aqueous solution and calcium sulfate, a process (S120) of molding a mixture obtained from the process (S110) of mixing and kneading, a process (S130) of drying the molded mixture obtained from the process (S120) of molding, and a process (S140) of firing the dry molded mixture obtained from the process (S130) of drying.

The details of each of the above-described processes are described below.

[Process (S100) of Preparing the Magnesium Compound Aqueous Solution]

In the process (S100) of preparing the magnesium compound aqueous solution, a hydrate or an anhydride of the magnesium compound is mixed with distilled water and the magnesium compound aqueous solution is prepared.

The employed magnesium compound may be a hydrate or an anhydride.

There is no restriction regarding a mixture ratio of the magnesium compound and distilled water when preparing the magnesium compound aqueous solution as long as content amount of the magnesium compound is below solubility of distilled water. It is preferable that a mixture liquid of the magnesium compound aqueous solution is prepared by determining an amount of water to be mixed to calcium sulfate with consideration to ease of pouring the magnesium compound aqueous solution in the process of molding described later and consideration to density and strength of the magnesium compound aqueous solution after hardening, and then dissolving a desired mixture amount of the magnesium compound.

[Process (S110) of Mixing and Kneading]

In the process (S110) of mixing and kneading, the magnesium compound aqueous solution obtained in the process (S100) of preparing the magnesium compound aqueous solution is mixed and kneaded (blended) with calcium sulfate. The mixture obtained from the process (S110) is prepared.

Calcium sulfate may be anhydrous gypsum or hemihydrate gypsum. Even if hemihydrate gypsum is employed, hemihydrate gypsum becomes anhydrous due to subsequent process of firing. In the embodiment of the present invention, α type hemihydrate gypsum is employed from the standpoint of density after molding. The employed calcium sulfate may have, for example, a powder form, a particle form, or an agglomerated form.

In addition, citric acid or the citric acid compound may be added when mixing and kneading calcium sulfate and the magnesium compound. When adding citric acid or the citric acid compound, a pre-mixture of calcium sulfate and citric acid or the citric acid compound may be prepared and then mixed and kneaded with the magnesium compound aqueous solution. The employed citric acid or the citric acid compound may have, for example, a powder form, a particle form, or an agglomerated form.

There is no restriction regarding the mixing and kneading time as long as calcium sulfate and the magnesium compound aqueous solution is sufficiently mixed and kneaded.

In addition, there is no restriction regarding the mixing and kneading temperature. In the embodiment of the present invention, the mixing and kneading temperature is room temperature.

[Process (S120) of Molding]

In the process (S120) of molding, the mixture obtained from the process (S110) is molded.

There is no restriction regarding a method of molding and may be a method of pouring the mixture in a predetermined mold, and hardening by leaving the poured mixture in the predetermined mold for a predetermined time period.

By mixing and kneading the magnesium compound aqueous solution to calcium sulfate, calcium sulfate dihydrate or $Ca_xMg_{1-x}SO_4 \cdot (2+k)H_2O$ is formed, and hardens. It is important to note that k varies according to the added amount of magnesium compound. There is no restriction regarding time period for hardening the mixture obtained from the process (S110) as long as the mixture obtained from the process (S110) sufficiently hardens.

[Process (S130) of Drying]

In the process (S130) of drying, the mixture obtained from the process (S110) that is hardened in the process (S120) of molding is removed from the mold and liquid form water adhering between crystals is dried under conditions of room temperature atmosphere.

[Process (S140) of Firing]

In the process (S140) of firing, the mixture obtained from the process (S110) that is dried is fired and an anhydride of the reaction material is obtained.

There is no restriction regarding conditions of firing as long as water is removed from the mixture obtained from the process (S110) that is dried and the anhydride of the reaction material is obtained. For example, the anhydride of the reaction material may be obtained by firing for a predetermined time period at a temperature of approximately 100° C. or more to approximately 200° C. or less under reduced pressure atmosphere or atmosphere.

Due to the manufacturing method of the reaction material according to an embodiment of the present invention, at least one part of calcium site of calcium sulfate (type III anhydrous gypsum) is substituted with magnesium. Thus, as described above, the reaction material according to an embodiment of the present invention includes $Ca_xMg_{1-x}SO_4$ in which at least one part of calcium site of type III anhydrous gypsum is substituted with magnesium. It is preferable that the whole of the reaction material has a uniform mixed state, however, the value of x may locally change within a crystal.

A crystal lattice of calcium sulfate of $Ca_xMg_{1-x}SO_4$ in which at least one part of calcium site of type III anhydrous gypsum is substituted with magnesium is deformed. Thus, even if heat storage-release processes are repeated, crystal structure change (phase change) from type III anhydrous gypsum to a more thermodynamically stable type II anhydrous gypsum may be suppressed. Accordingly, the reaction material according to an embodiment of the present invention may maintain heat storage-release properties equivalent to type III anhydrous gypsum. In addition, the reaction material according to an embodiment of the present invention for the chemical heat pump has good repetition durability.

<Chemical Heat Pump>

The following is a description of an example of a configuration of the chemical heat pump employing the reaction material according to an embodiment of the present invention with reference to drawings. A configuration of a typical chemical heat pump is described in this patent specification, however the present invention is not limited to the exemplary embodiments described below.

FIG. 1 is a schematic view of a configuration of one example of the chemical heat pump according to an embodiment of the present invention.

The chemical heat pump 100 according to an embodiment of the present invention includes a reaction member 120 accommodating the reaction material R according to an embodiment of the present invention, and an evaporator-condenser member 140 that condenses a gaseous reaction medium or evaporates a liquid reaction medium.

In addition, the chemical heat pump 100 includes a connecting member 160 configured of connection pipes connecting the reaction member 120 and the evaporator-condenser 140.

The reaction member 120 includes a reactor 122 and a first heat exchanger 124 provided at an outer side of the reactor 122. Due to the first heat exchanger 124, heat transfer with outside of the reactor 122 may be conducted. Normally, a heat medium flow path not shown in FIG. 1 is formed on the outside of the reactor 122 and reaction heat generated by the reactor 122 is supplied to a heat medium via the first heat exchanger 124 and the heat medium flow path.

FIG. 1 shows an example of the chemical heat pump 100 having one reactor 122 for explanation. However, the chemical heat pump 100 may have a plurality of reactor 122.

The evaporator-condenser member 140 includes a condenser 142 for condensing the gaseous reaction medium, an evaporator 144 for evaporating the liquid reaction medium, and a first connecting pipe 146 connecting the condenser 142 and the evaporator 144. The first connecting pipe 146 includes a first opening-closing valve 148. The first opening-closing valve 148 controls the connection between the condenser 142 and the evaporator 144. In other words, the first opening-closing valve 148 controls the movement of the reaction medium.

The condenser 142 and the evaporator 144 include a second heat exchanger 150 and a third heat exchanger 152, respectively. Due to the second heat exchanger 150 and the third heat exchanger 152, heat transfer with outside of the condenser 142 and the evaporator 144 may be conducted, respectively. More specifically, the condenser 142 may convert water vapor to liquid water by releasing heat outside of the condenser 142 with the second heat exchanger 150. The evaporator 144 may convert liquid water to water vapor by receiving heat from outside of the evaporator 144 with the third heat exchanger 152. By operating the first connecting pipe 146 and the first opening-closing valve 148, liquid water (and water vapor) condensed by the condenser 142 may be supplied to the evaporator 144 side.

The chemical heat pump 100 according to an embodiment of the present invention includes the connecting member 160 connecting the reaction member 120 and the evaporator-condenser member 140. The connecting member 160 includes a second connecting pipe 162 connecting the reactor 122 and the condenser 142 and a third connecting pipe 164 connecting the reactor 122 and the evaporator 144. The second connecting pipe 162 and the third connecting pipe 164 includes a second opening-closing valve 166 and a third opening-closing valve 168, respectively.

Water vapor (and water) released in the reactor 122 may be supplied to the condenser 142 via the second connecting pipe 162. In addition, water vapor (and water) generated in the evaporator 144 may be supplied to the reactor 122 via the third connecting pipe 164. In other words, the chemical heat pump 100 condenses water vapor generated by the reacting member 120 with the condenser 142, supplies water formed of condensed water vapor to the evaporator 144, evaporates supplied water with the evaporator 144, and supplies water vapor formed from supplied water to the reacting member 120.

Next, an example of operation of the chemical heat pump according to an embodiment of the present invention is described below with reference to the drawings.

FIG. 2A and FIG. 2B are a schematic view of an example of operation of the chemical heat pump according to an embodiment of the present invention. More specifically, FIG. 2A is a schematic view of an example of operation of the chemical heat pump in a heat storage process and FIG. 2B is a schematic view of an example of operation of the chemical heat pump in a heat release process.

In the heat storage process shown in FIG. 2A, for example, heat such as excessive exhaust heat is supplied to the reactor 122 via the first heat exchanger 124. In the reactor 122, a desorption reaction in which water vapor desorbs from a hydrate of the reaction material R and water vapor occurs due to supplied heat. Due to the desorption reaction, water vapor is generated in the reactor 122.

The generated water vapor is introduced to the condenser 142 via the second connecting pipe 162. In the introduction state, the second opening-closing valve 166 is in an open state.

Water vapor introduced to the condenser 142 is discharged to an outer side of the evaporator-condenser member 140 via the second heat exchanger 150 in the condenser 142, or condensed employing low temperature heat from a low temperature heat source to liquefy into water. After completion of the above-described action, the first opening-closing valve 148 of the first connecting pipe 146 is opened and water is moved from the condenser 142 to the evaporator 144.

On the other hand, in the heat release process shown in FIG. 2B, water is evaporated to form water vapor via the third heat exchanger 152 in the evaporator 144. When evaporating water to form water vapor, heat of evaporation is absorbed from outside. Accordingly, the chemical heat pump 100 may cool outside by employing heat of evaporation.

Water vapor is introduced to the reactor 122 by opening the third opening-closing valve 168. Then, water vapor is introduced to the reactor 122 and the reaction material R adsorbs water vapor and becomes a hydrate. When adsorbing, heat is released in the reactor 122.

In other words, according to the above-described operation sequence, the chemical heat pump 100 according to an embodiment of the present invention may conduct the following. As shown in FIG. 2A, the reaction member 120 absorbs high heat from outside and discharges heat from the evaporator-condenser member 140. As shown in FIG. 2B, the evaporator-condenser member 140 absorbs high heat from outside and discharges heat from the reaction member 120.

EXAMPLES

Further understanding can be obtained by reference to specific examples, which are provided hereinafter. However, it is to be understood that the embodiments of the present invention are not limited to the following examples.

First Example

The following is a description of reaction materials according to an embodiment of the present invention of the first example in which suppression of crystal structure change to type II anhydrous gypsum is confirmed even when a load is applied.

Multiple magnesium sulfate aqueous solutions are prepared by adding 85.3 parts by weight of magnesium sulfate heptahydrate with respect to 7400 parts by weight of distilled water, 171.5 parts by weight of magnesium sulfate heptahydrate with respect to 7400 parts by weight of distilled water, and 893.8 parts by weight of magnesium sulfate heptahydrate with respect to 7400 parts by weight of distilled water.

With respect to each magnesium sulfate aqueous solution, 10,000 parts by weight of α type hemihydrate gypsum (Sakura gypsum A class, from Yoshino Gypsum Co., Ltd.) is added, mixed, and kneaded. Each mixture of magnesium sulfate aqueous solution and α type hemihydrate gypsum (Sakura gypsum A class, from Yoshino Gypsum Co., Ltd.) is poured in a predetermined mold and hardened. The average composition of each mixture calculated from prepared amount $Ca_{0.99}Mg_{0.01}SO_4[n'_{Mg}/(n_{Ca}+n'_{Mg})=0.01]$, $Ca_{0.98}Mg_{0.02}SO_4[n'_{Mg}/(n_{Ca}+n'_{Mg})=0.02]$, and $Ca_{0.95}Mg_{0.05}SO_4[n'_{Mg}/(n_{Ca}+n'_{Mg})=0.05]$, respectively.

In addition, multiple magnesium nitrate aqueous solutions are prepared by adding 88.8 parts by weight of magnesium nitrate hexahydrate with respect to 4000 parts by weight of distilled water, 178.4 parts by weight of magnesium nitrate hexahydrate with respect to 4000 parts by weight of distilled water, and 360.5 parts by weight of magnesium nitrate hexahydrate with respect to 4000 parts by weight of distilled water.

With respect to each magnesium nitrate aqueous solution, 10,000 parts by weight of α type hemihydrate gypsum (Sakura gypsum A class, from Yoshino Gypsum Co., Ltd.) is added, mixed, and kneaded. Each mixture of magnesium nitrate aqueous solution and α type hemihydrate gypsum (Sakura gypsum A class, from Yoshino Gypsum Co., Ltd.) is poured in a predetermined mold and hardened. The average composition of each mixture calculated from prepared amount is $Ca_{0.995}Mg_{0.005}SO_4[n'_{Mg}/(n_{Ca}+n'_{Mg})=0.005]$, $Ca_{0.99}Mg_{0.01}SO_4[n'_{Mg}/(n_{Ca}+n'_{Mg})=0.01]$, and $Ca_{0.98}Mg_{0.02}SO_4[n'_{Mg}/(n_{Ca}+n'_{Mg})=0.02]$, respectively.

In addition, multiple magnesium acetate aqueous solutions are prepared by adding 74.2 parts by weight of magnesium acetate tetrahydrate with respect to 4000 parts by weight of distilled water, 149.2 parts by weight of magnesium acetate tetrahydrate with respect to 4000 parts by weight of distilled water, and 301.5 parts by weight of magnesium acetate tetrahydrate with respect to 4000 parts by weight of distilled water.

With respect to each magnesium acetate aqueous solution, 10,000 parts by weight of α type hemihydrate gypsum (Sakura gypsum A class, from Yoshino Gypsum Co., Ltd.) is added, mixed, and kneaded. Each mixture of magnesium acetate aqueous solution and α type hemihydrate gypsum (Sakura gypsum A class, from Yoshino Gypsum Co., Ltd.) is poured in a predetermined mold and hardened. The average composition of each mixture calculated from prepared amount is $Ca_{0.995}Mg_{0.005}SO_4[n'_{Mg}/(n_{Ca}+n'_{Mg})=0.005]$, $Ca_{0.99}Mg_{0.01}SO_4[n'_{Mg}/(n_{Ca}+n'_{Mg})=0.01]$, and $Ca_{0.98}Mg_{0.02}SO_4[n'_{Mg}/(n_{Ca}+n'_{Mg})=0.02]$, respectively.

In addition, multiple magnesium hydroxide aqueous solutions are prepared by adding 20.2 parts by weight of magnesium hydroxide with respect to 4000 parts by weight of distilled water, 40.6 parts by weight of magnesium hydroxide with respect to 4000 parts by weight of distilled water, 82.0 parts by weight of magnesium hydroxide with respect to 4000 parts by weight of distilled water, 167.4 parts by weight of magnesium hydroxide with respect to 4000 parts by weight of distilled water, and 349.4 parts by weight of magnesium hydroxide with respect to 4000 parts by weight of distilled water.

With respect to each magnesium hydroxide aqueous solution, 10,000 parts by weight of α type hemihydrate gypsum (Sakura gypsum A class, from Yoshino Gypsum Co., Ltd.) is added, mixed, and kneaded. Each mixture of magnesium hydroxide aqueous solution and α type hemihydrate gypsum (Sakura gypsum A class, from Yoshino Gypsum Co., Ltd.) is poured in a predetermined mold and hardened. The average composition of each mixture calculated from prepared amount is $Ca_{0.995}Mg_{0.005}SO_4[n'_{Mg}/(n_{Ca}+n'_{Mg})=0.005]$, $Ca_{0.99}Mg_{0.01}SO_4[n'_{Mg}/(n_{Ca}+n'_{Mg})=0.01]$, $Ca_{0.98}Mg_{0.02}SO_4[n'_{Mg}/(n_{Ca}+n'_{Mg})=0.02]$, $Ca_{0.96}Mg_{0.04}SO_4[n'_{Mg}/(n_{Ca}+n'_{Mg})=0.04]$, and $Ca_{0.92}Mg_{0.08}SO_4[n'_{Mg}/(n_{Ca}+n'_{Mg})=0.08]$, respectively.

In addition, multiple magnesium benzoate aqueous solutions are prepared by adding 44.3 parts by weight of magnesium benzoate trihydrate with respect to 4000 parts by weight of distilled water, 110.0 parts by weight of magnesium benzoate trihydrate with respect to 4000 parts by weight of distilled water, and 223.1 parts by weight of magnesium benzoate trihydrate with respect to 4000 parts by weight of distilled water.

With respect to each magnesium benzoate aqueous solution, 10,000 parts by weight of α type hemihydrate gypsum (Sakura gypsum A class, from Yoshino Gypsum Co., Ltd.) is added, mixed, and kneaded. Each mixture of magnesium benzoate aqueous solution and α type hemihydrate gypsum (Sakura gypsum A class, from Yoshino Gypsum Co., Ltd.) is poured in a predetermined mold and hardened. The average composition of each mixture calculated from prepared amount is $Ca_{0.998}Mg_{0.002}SO_4[n'_{Mg}/(n_{Ca}+n'_{Mg})=0.002]$, $Ca_{0.995}Mg_{0.005}SO_4[n'_{Mg}/(n_{Ca}+n'_{Mg})=0.005]$, and $Ca_{0.99}Mg_{0.01}SO_4[n'_{Mg}/(n_{Ca}+n'_{Mg})=0.01]$, respectively.

The hardened mixtures are removed from the predetermined mold, dried with a thereto-humidistat tank, and dehydrated by sufficiently heating at 180° C. Accordingly, reaction materials (anhydride of calcium sulfate) of the first example are obtained.

Further, a comparative example is obtained by repeating the above-described preparation except for not adding the above-described magnesium compounds. Accordingly, a comparative reaction material (anhydride of calcium sulfate) of the first example is obtained.

With respect to each of the reaction materials and the comparative example of the first example, the load of the following conditions is conducted to change to type II anhydrous gypsum.

A sample of each of the reaction materials and the comparative example of the first example is held in a container, the container is decompressed with a vacuum pump, and heating for 30 minutes at a temperature of 180° C. is conducted. An anhydride of each sample is obtained. The anhydride of each sample is hydrated for one hour by introducing water vapor of 100 kPa in the container. It is important to note that the above-described conditions correspond to conditions in which degradation of a reaction material progress most in typical use of a chemical heat pump employing calcium sulfate, i.e., use of the chemical heat pump with water vapor pressure being 1 atmospheric pressure or less. By applying the above-described temperature and pressure conditions for a long time period, degradation of the reaction material progresses.

Each of the reaction materials and the comparative example of the first example processed to change to type II anhydrous gypsum and each of the reaction materials and the comparative example of the first example without processing to change to type II anhydrous gypsum are left standing for one day in a thermo-humidistat tank having a temperature of 25° C. and 50% RH. Amount of water absorption is compared.

FIG. 3 is one example of a graph explaining degradation characteristics of reaction materials according to an embodiment of the present invention. The horizontal axis of FIG. 3 is mol fraction of magnesium with respect to calcium and magnesium in each of the reaction materials of the first example, and the vertical axis of FIG. 3 is non-degradation rate. Non-degradation rate of the reaction materials of the first example are determined as amount of water absorption of the reaction materials of the first example processed to change to type II anhydrous gypsum with respect to amount of water absorption of the reaction materials of the first example without processing to change to type II anhydrous gypsum. In other words, the higher non-degradation rate of the reaction material of the first example, change to type II anhydrous gypsum does not progress even in a case in which the above-described processing to change to type II anhydrous gypsum is applied. Accordingly, the reaction material of the first example having high non-degradation rate may be said to have good degradation characteristics. In addition, the results of the above-described non-degradation rate are calculated with subtracting hydrate water moisture calculated from mixture amount of the magnesium compound.

As shown in FIG. 3, non-degradation rate of the reaction material of the first example including magnesium sulfate as the magnesium compound is higher compared to the comparative reaction material of the first example. Non-degradation rate is almost the same for conditions of 0.01 (1%) mol fraction of magnesium and 0.05 (5%) mol fraction of magnesium. Thus, a mixture ratio in which suppression of change to type II anhydrous gypsum is largest is between 0.01 (1%) mol fraction of magnesium to 0.05 (5%) mol fraction of magnesium.

In addition, as shown in FIG. 3, non-degradation rate of the reaction material of the first example including magnesium nitrate as the magnesium compound is higher compared to the comparative reaction material of the first example. A decline of 0.01 (1%) of non-degradation rate is seen for conditions of 0.005 (0.5%) mol fraction of magnesium and 0.01 (1%) mol fraction of magnesium. Thus, a mixture ratio in which suppression of change to type II anhydrous gypsum is largest is around 0.005 mol fraction of magnesium.

In addition, as shown in FIG. 3, non-degradation rate of the reaction material of the first example including magnesium acetate as the magnesium compound is higher compared to the comparative reaction material of the first example. A decline of 0.02 (2%) of non-degradation rate is seen for conditions of 0.01 (1%) mol fraction of magnesium and 0.02 (2%) mol fraction of magnesium. Thus, a mixture ratio in which suppression of change to type II anhydrous gypsum is largest is around 0.01 mol fraction of magnesium.

In addition, as shown in FIG. 3, non-degradation rate of the reaction material of the first example including magnesium hydroxide as the magnesium compound is higher compared to the comparative reaction material of the first example. Non-degradation rate is almost the same for conditions of 0.04 (4%) mol fraction of magnesium and 0.08 (8%) mol fraction of magnesium. Thus, a mixture ratio in which suppression of change to type II anhydrous gypsum is largest is between 0.04 (4%) mol fraction of magnesium to 0.08 (8%) mol fraction of magnesium.

In addition, as shown in FIG. 3, non-degradation rate of the reaction material of the first example including magnesium benzoate as the magnesium compound is higher compared to the comparative reaction material of the first example. In a range of the reaction materials of the first example including magnesium benzoate as the magnesium compound, the larger mol fraction of magnesium is non-degradation rate becomes larger. However, preparing a magnesium benzoate aqueous solution having a concentration beyond 0.01 (1%) mol fraction of magnesium at normal temperature is difficult. Thus, suppression of change to type II anhydrous gypsum is largest at 0.01 (1%) mol fraction of magnesium.

In view of the foregoing, the reaction materials of the first example are understood to suppress crystal structure change to type II anhydrous gypsum even when a severe load is applied to the reaction material according to an embodiment of the present invention of the first example.

Second Example

Multiple reaction materials (anhydride of a sulphate compound) according to an embodiment of the present invention of the second example are prepared by repeating the preparation of the first example employing magnesium sulfate as the magnesium compound. The average composition calculated from prepared amount of each is $Ca_{0.99}Mg_{0.01}SO_4[n'_{Mg}/(n_{Ca}+n'_{Mg})=0.01]$, $Ca_{0.98}Mg_{0.02}SO_4[n'_{Mg}/(n_{Ca}+n'_{Mg})=0.02]$, and $Ca_{0.97}Mg_{0.03}SO_4[n'_{Mg}/(n_{Ca}+n'_{Mg})=0.03]$. In addition, a comparative reaction material (anhydride of calcium sulfate) of the second example as a comparative example is obtained by repeating the above-described preparation except for not adding magnesium sulfate heptahydrate.

With respect to the obtained reaction materials and the comparative reaction material of the second example, a load of a hydration process (heat release process) and a dehydration process (heat storage process) of the following conditions is repeated for a predetermined number of times, and the calculation of the first example is repeated to measure transition of non-degradation rate.

The conditions are placing the reaction materials and the comparative reaction material of the second example in a thermostatic container and maintained at a temperature of 180° C., applying a hydration process of water vapor pressure of approximately 90 kPa for four hours, and applying a dehydration process of water vapor pressure of approximately 1.5 kPa for 30 minutes.

It is important to note that the above-described conditions correspond to conditions in which degradation of a reaction material progress most in typical use of a chemical heat pump employing calcium sulfate, i.e., use of the chemical heat pump with water vapor pressure being 1 atmospheric pressure or less. By applying the above-described temperature and pressure conditions for a long time period, degradation of the reaction material progresses.

FIG. 4 is another example of a graph explaining degradation characteristics of reaction materials according to an embodiment of the present invention. The horizontal axis of FIG. 4 is the number of times the above-described processing to change to type II anhydrous gypsum and dehydration process is repeated, and the vertical axis is non-degradation rate.

As shown in FIG. 4, the reaction materials (diamond symbol, square symbol, and triangle symbol in FIG. 4) according to an embodiment of the present invention of the second example have non-degradation rate of 90% or more even when the heat release process and the heat storage process are repeated. By contrast, non-degradation rate of the comparative reaction material (x symbol in FIG. 4) of the second example declined to 10% or less with an application of the hydration process and the dehydration process for one time.

Third Example

A reaction material according to an embodiment of the present invention of the third example and a comparative reaction material of the third example are prepared by repeating the preparation of the first example.

The reaction material of the third example having 0.01 (1%) mol fraction of magnesium is applied with the above-described hydration process and dehydration process for three times as a heat load, sufficiently dehydrated at a temperature of 150° C. to form into an anhydride, left standing in a temperature of 25° C. and 50% RH, and analyzed with X-ray diffraction (XRD). For comparison, the reaction material of the third example having 0.01 (1%) mol fraction of magnesium without applying the above-described hydration process and dehydration process is left standing in a temperature of 25° C. and 50% RH, and analyzed with XRD.

It is generally known that type III calcium sulfate changes to a hemihydrate and type II calcium sulfate is maintained as an anhydride when left standing in a temperature of 25° C. and 50% RH. In other words, by comparing a XRD peak strength of hemihydrate gypsum and a XRD peak strength of type II anhydrous gypsum, a result that is the same as comparing a XRD peak strength of type III anhydrous gypsum and a XRD peak strength of type II anhydrous gypsum is obtained.

Figure 5A:
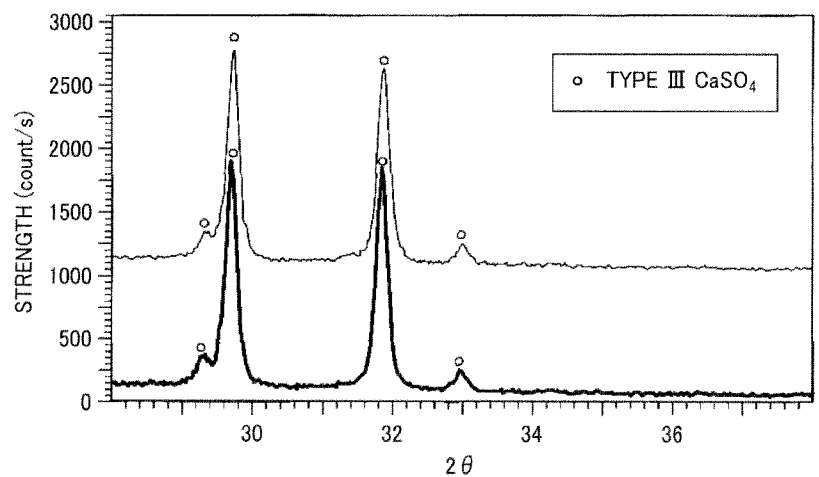
FIG. 5A is one example of a graph explaining X-ray diffraction (XRD) results of a reaction material according to an embodiment of the present invention.
Figure 5B:
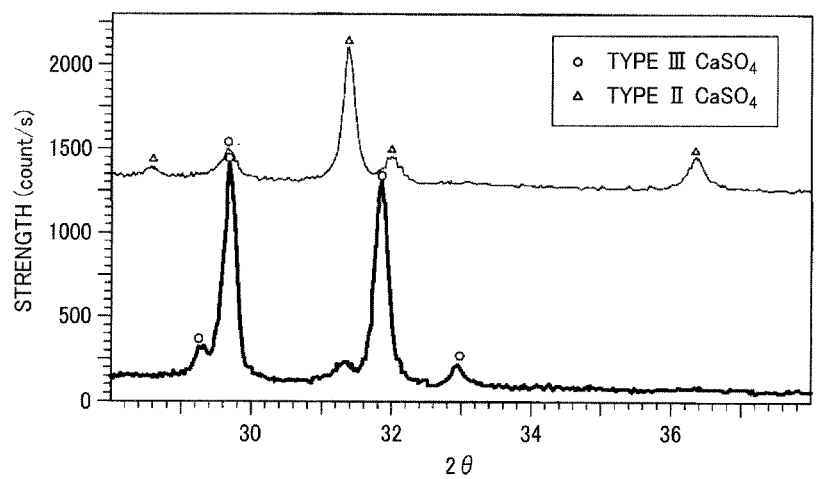
FIG. 5B is another example of a graph explaining X-ray diffraction (XRD) results of a comparative reaction material according to an embodiment of the present invention.

FIG. 5A and FIG. 5B are examples of a graph explaining X-ray diffraction (XRD) results of the reaction material of the third example employing magnesium sulfate as the magnesium compound. More specifically, FIG. 5A is the result of the reaction material of the third example and FIG. 5B is the result of the comparative reaction material of the third example. In FIG. 5A and FIG. 5B, the thick line represents the reaction material of the third example without applying the above-described hydration process and dehydration process, and the thin line represents the reaction material of the third example after applying the above-described hydration process and dehydration process. In FIG. 5A and FIG. 5B, the circle symbol represents a theoretical peak position of calcium sulfate hemihydrate, and the triangle symbol represents a theoretical peak position of type II calcium sulfate.

As shown in FIG. 5A, the reaction material of the third example without applying the heat load exhibits a peak of type III calcium sulfate. In addition, the reaction material of the third example applied with the heat load also exhibits a peak of type III calcium sulfate. On the other hand, a peak derived from type II calcium sulfate is only slightly exhibited around $2\theta=31.4°$ C. as shown in FIG. 5B. In other words, crystal structure change to type II calcium sulfate is suppressed in the reaction material of the third example even when the heat load is applied. It is understood that even when the heat load is applied, phase change to type II calcium sulfate does not occur because at least one part of calcium site of type III calcium sulfate is substituted with magnesium making a deformed crystal lattice of calcium sulfate.

From the XRD results of the reaction material of the third example, a peak derived from the magnesium compound is not exhibited. When other magnesium compounds are employed as the magnesium compound in the reaction material of the third example, the XRD results exhibited the same tendency.

On the other hand, as shown in FIG. 5B, the comparative reaction material of the third example without applying the heat load exhibits a main peak of type III calcium sulfate and a sub-peak of type II calcium sulfate. It is understood that the sub-peak of type II calcium sulfate is due to change of calcium sulfate to type II calcium sulfate at manufacture of the reaction material of the third example. Accordingly, it is understood that the reaction material of the third example represented by FIG. 5A suppress change of calcium sulfate to type II calcium sulfate even at manufacture of the reaction material of the third example.

Further, the comparative reaction material of the third example applied with the heat load exhibits a weaker peak of type III calcium sulfate and a strong peak of type II calcium sulfate. In other words, when the comparative reaction material of the third example is subjected to repeated processing to change to type II calcium sulfate and dehydration process, it is understood that crystal structure change from type III calcium sulfate to type II calcium sulfate may easily progress.

Type II calcium sulfate does not react with water vapor and is unsuitable for the reaction material of the chemical heat pump. However, the reaction material of the third example suppresses change to type II calcium sulfate and maintain crystal structure of type III calcium sulfate. Accordingly, the reaction material of the third example has a characteristic desired by the chemical heat pump of being difficult to degrade and may be said to be suitable for the reaction material of the chemical heat pump.

Fourth Example

Multiple reaction materials according to an embodiment of the present invention of the fourth example are prepared by repeating the preparation of the first example. In addition, a comparative reaction material (anhydride of calcium sulfate) of the fourth example as a comparative example is obtained by repeating the above-described preparation except for not adding a magnesium compound.

Shown in table 1 are the type of magnesium compounds and the content amount (mixture ratio) of the magnesium compounds at manufacture of the reaction materials of the fourth example.

TABLE 1

| | Magnesium compound | | Ratio of type II anhydrous gypsum |
|---|---|---|---|
| | Type | Content amount | |
| Comparative reaction material | — | — | 47% |
| Reaction material 1 | Magnesium sulfate | 2 mol % | 6% |
| Reaction material 2 | Magnesium nitrate | 0.5 mol % | 11% |
| Reaction material 3 | Magnesium acetate | 0.5 mol % | 9% |

TABLE 1-continued

| | Magnesium compound | | Ratio of type II anhydrous gypsum |
|---|---|---|---|
| | Type | Content amount | |
| Reaction material 4 | Magnesium hydroxide | 4 mol % | 26% |
| Reaction material 5 | Magnesium benzoate | 1 mol % | 18% |
| Reaction material 6 | Magnesium chloride | 0.5 mol % | 25% |
| Reaction material 7 | Magnesium bromide | 0.5 mol % | 33% |
| Reaction material 8 | Magnesium iodide | 0.5 mol % | 34% |

With respect to each of the obtained reaction materials and the comparative reaction material of the fourth example, a load of a hydration process (heat release process) and a dehydration process (heat storage process) of the following conditions is applied.

Regarding the heat storage process, a heat medium having a temperature of 150° C. is introduced to the reactor 122 from the first heat exchanger 124 and water moisture is evaporated from the reaction materials of the fourth example. The evaporated water moisture is introduced to the condenser 142 via the second connecting pipe 162 and is liquefied by setting the condenser 142 to a water vapor pressure of 1.5 kPa. The heat storage process is conducted for 10 minutes. Regarding the heat release process, the evaporator 144 is set to a water vapor pressure of 90 kPa and water vapor is exposed (supplied) to the reaction materials of the fourth example via the third connecting pipe 164. The reaction materials of the fourth example having absorbed the water vapor generates a heat of approximately 185° C., raises the temperature of the heat medium having a temperature of 150° C. introduced to the reactor 122, and raised temperature heat is extracted at the first heat exchanger 124. The heat release process is conducted for 10 minutes. The above-described heat storage process and heat release process is considered as one heat storage-release process, and an operation of the heat storage-release process is repeated twenty times. It is important to note that the above-described conditions correspond to conditions near to actual operation in typical use of a chemical heat pump employing calcium sulfate, i.e., use of the chemical heat pump with water vapor pressure being 1 atmospheric pressure or less. The above-described conditions are conditions in which degradation progress of a reaction material is slower than the conditions of the load of the first and second examples.

After repeating the heat storage-release process for twenty times, ratio of type II calcium sulfate in the reaction materials of the fourth example is evaluated with XRD measurement. It is important to note that ratio may be determined by comparing a XRD pattern of a reaction material and a XRD pattern of type III anhydrous gypsum alone and type II anhydrous gypsum alone.

Figure 6:
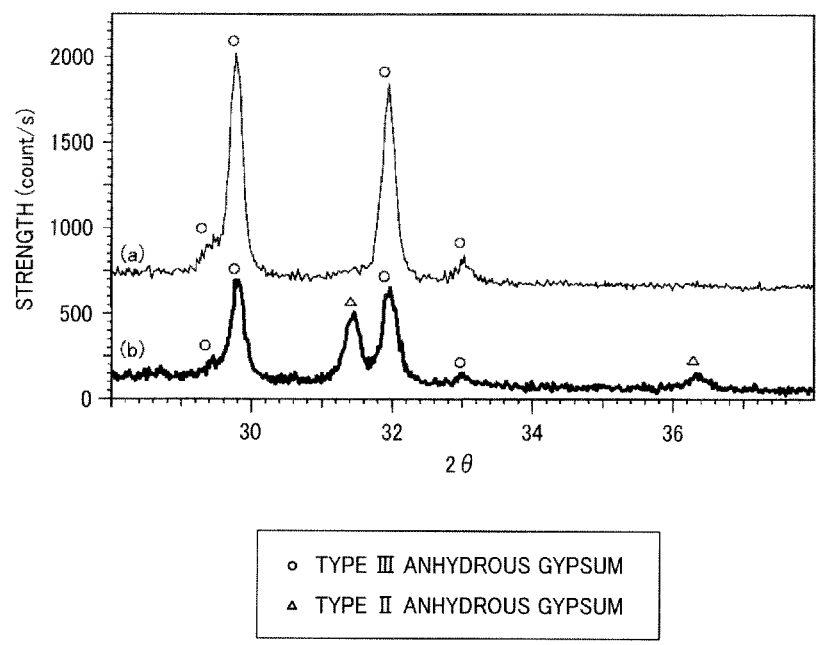
FIG. 6 is another example of a graph explaining X-ray diffraction (XRD) results of a reaction material according to an embodiment of the present invention.

An example of a XRD pattern is shown in FIG. 6. FIG. 6 is another example of a graph explaining X-ray diffraction (XRD) results of a reaction material according to an embodiment of the present invention. In FIG. 6, a diffraction pattern shown on the upper side of the graph is a XRD pattern of the reaction material 1 of the fourth example, and a diffraction pattern shown on the lower side of the graph is a XRD pattern of the comparative reaction material of the fourth example.

XRD pattern of crystal other than type III anhydrous gypsum of the reaction materials of the fourth example after repeating heat storage-release process is not observed. In addition, XRD pattern of crystal other than hemihydrate gypsum of the reaction materials of the fourth example before conducting repeated heat storage-release process is not observed.

The comparative reaction material of the fourth example after repeating the above-described heat storage-release process twenty times exhibited a ratio of type II anhydrous gypsum of 47%. The reaction material 1 of the fourth example exhibited a ratio of type II anhydrous gypsum of 6%. Further, the other reaction materials of the fourth example exhibited a smaller ratio of type II anhydrous gypsum compared to the comparative reaction material of the fourth example. From the results, it is understood that by mixing and kneading the magnesium compounds to the reaction materials of the fourth example, phase change of crystal structure from type III anhydrous gypsum to type II anhydrous gypsum is suppressed.

Fifth Example

Multiple reaction materials according to an embodiment of the present invention of the fifth example are prepared by repeating the preparation of the first example. In addition, a comparative reaction material (anhydride of calcium sulfate) of the fifth example as a comparative example is obtained by repeating the above-described preparation except for not adding a magnesium compound.

Shown in table 2 are the type of magnesium compounds and the content amount (mixture ratio) of the magnesium compounds at manufacture of the reaction materials of the fifth example. Further, reaction material 1, reaction material 2, and reaction material 3 of the fourth example and the comparative reaction material of the fourth example are manufactured and shown in table 2 indicated with the same reference name and number of reaction material 1, reaction material 2, reaction material 3, and comparative reaction material.

the fifth example, reaction material 9, reaction material 10, reaction material 11, and reaction material 12 are 23%, 9%, 16%, and 13%, respectively.

In view of the foregoing, it is understood that by including multiple magnesium compounds or adding citric acid or calcium citrate as the additive, structural change of type III anhydrous gypsum in the reaction materials of the fifth example from type III anhydrous gypsum to type II anhydrous gypsum is further efficiently suppressed.

Figure 7:
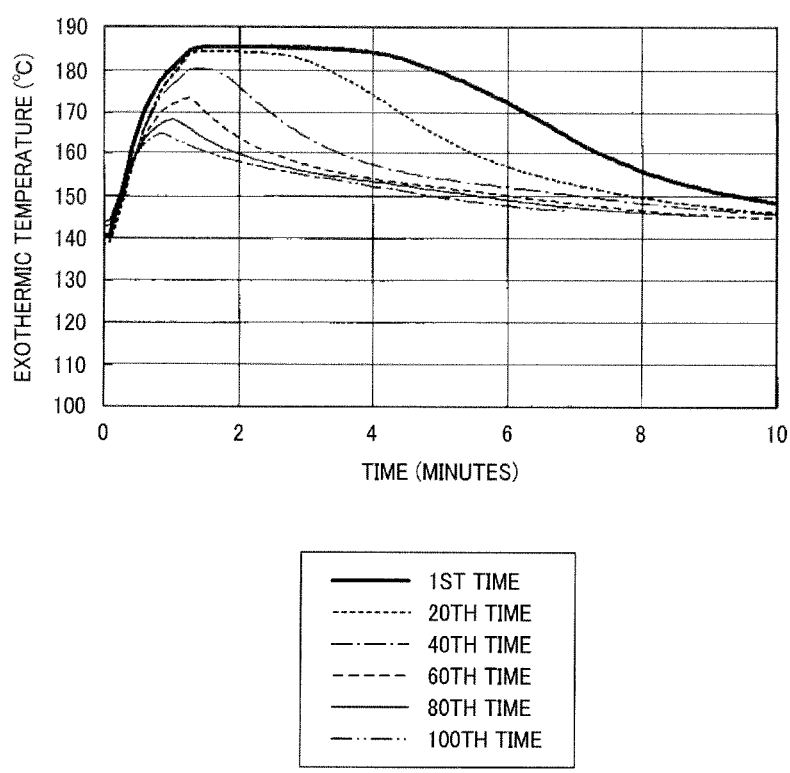
FIG. 7 is another example of a graph explaining degradation characteristics of a comparative reaction material according to an embodiment of the present invention.

FIG. 7 is another example of a graph explaining degradation characteristics of a comparative reaction material according to an embodiment of the present invention. More specifically, FIG. 7 is a graph indicating temporal change of temperature of the comparative reaction material of the fifth example in the heat release process. The horizontal axis of FIG. 7 is time period of the heat release process and the vertical axis is temperature of the comparative reaction material of the fifth example.

As shown in FIG. 7, the comparative reaction material of the fifth example exhibits a heat generation characteristic of 185° C. in the first application of the heat release process. However, temperature of heat generated by the comparative reaction material of the fifth example declines as the number of times of applying the heat release process increases. At the one hundredth time of the heat release process, the heat generation characteristic of the comparative reaction material of the fifth example is 165° C. In addition, time of heat generation of the comparative reaction material of the fifth example declines as the number of times the application of the load increases. It is understood that decline in temperature of generated heat and decline in time of heat generation is due to structure change of type III anhydrous gypsum to type II anhydrous gypsum having a lower heat storage-release characteristic.

TABLE 2

| | Magnesium compound | | Magnesium compound | | Additive | | Ratio of type II anhydrous gypsum |
|---|---|---|---|---|---|---|---|
| | Type | Content amount | Type | Content amount | Type | Content amount | |
| Comparative reaction material | — | — | — | — | — | — | 86% |
| Reaction material 1 | Magnesium sulfate | 2 mol % | — | — | — | — | 39% |
| Reaction material 2 | Magnesium nitrate | 0.5 mol % | — | — | — | — | 52% |
| Reaction material 3 | Magnesium acetate | 0.5 mol % | — | — | — | — | 49% |
| Reaction material 9 | Magnesium sulfate | 2 mol % | Magnesium nitrate | 0.1 mol % | | | 23% |
| Reaction material 10 | Magnesium sulfate | 2 mol % | Magnesium acetate | 0.3 mol % | | | 9% |
| Reaction material 11 | Magnesium sulfate | 2 mol % | — | — | Citric acid | 0.1 mol % | 16% |
| Reaction material 12 | Magnesium sulfate | 2 mol % | — | — | Calcium citrate | 0.1 mol % | 13% |

With respect to each of the obtained reaction materials of the fifth example, and each of the obtained reaction materials and the comparative reaction material of the fourth example, the load of the fourth example is applied except for the number of times the load is repeated is changed from twenty times to one hundred times. Accordingly, ratio of type II anhydrous gypsum is obtained.

Figure 8:
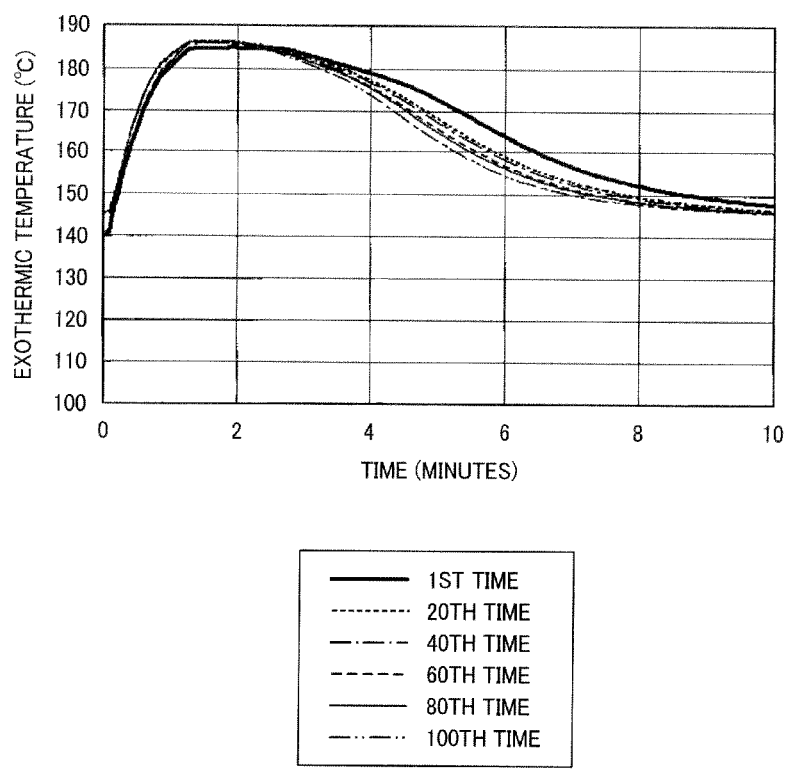
FIG. 8 is another example of a graph explaining degradation characteristics of a reaction material according to an embodiment of the present invention.

The ratio of type II anhydrous gypsum of the reaction materials and the comparative reaction material of the fourth example are 86%, 39%, 52%, and 49%, respectively. The ratio of type II anhydrous gypsum of the reaction materials of FIG. 8 is another example of a graph explaining degradation characteristics of a reaction material according to an embodiment of the present invention. More specifically, FIG. 8 is a graph indicating temporal change of temperature of the reaction material 10 of the fifth example in the heat release process. The horizontal axis of FIG. 8 is time period of the heat release process and the vertical axis is temperature of the comparative reaction material of the fifth example.

As shown in FIG. 8, the reaction material 10 of the fifth example exhibits a heat generation characteristic of 185° C. in the first application of the heat release process. Temperature of heat generated by the reaction material 10 of the fifth example almost does not decline even when the number of times of applying the heat release process increases. At the one hundredth time of the heat release process, the heat generation characteristic of the reaction material 10 of the fifth example is 185° C. In addition, time of heat generation of the reaction material 10 of the fifth example almost does not decline even at the one hundredth time of application of the heat release process compared to the first application of the heat release process. It is understood that almost no decline in temperature of generated heat and almost no decline in time of heat generation is due to the reaction material 10 of the fifth example suppressing phase change to type II anhydrous gypsum. In addition, the other reaction materials of the fifth example exhibited the same heat generation characteristic.

Accordingly, it is understood that the reaction materials of the fifth example suppresses crystal structure change from type III calcium sulfate to type II calcium sulfate even when heat storage-release process is repeated. The reaction materials of the fifth example are reaction materials for the chemical heat pump having good heat storage-release characteristics and good degradation characteristics.

What is claimed is:

1. A reaction material for a chemical heat pump, comprising:
   type III anhydrous gypsum;
   a magnesium compound; and
   $Ca_xMg_{1-x}SO_4$,
   wherein the reaction material for the chemical heat pump structurally changes between a compound including type III anhydrous gypsum, the magnesium compound, and $Ca_xMg_{1-x}SO_4$, and a compound including hemihydrate gypsum, a hydrate of the magnesium compound, and a hydrate of $Ca_xMg_{1-x}SO_4$ when subjected to heat storage process and heat release process, and
   x is $0<x<1$.

2. The reaction material for the chemical heat pump of claim 1, wherein the magnesium compound includes one compound or more selected from a group of magnesium sulfate, magnesium nitrate, magnesium acetate, magnesium hydroxide, magnesium benzoate, magnesium chloride, magnesium bromide, and magnesium iodide.

3. The reaction material for the chemical heat pump of claim 1, wherein $Ca_xMg_{1-x}SO_4$ has a crystal structure in which at least one part of calcium site of type III anhydrous gypsum is substituted with magnesium.

4. The reaction material for the chemical heat pump of claim 1, wherein the reaction material for the chemical heat pump has a diffraction peak derived from a crystal structure of type III anhydrous gypsum or of hemihydrate gypsum.

5. A chemical heat pump, comprising:
   a reaction member;
   an evaporator-condenser member;
   a connecting member; and
   an opening-closing mechanism,
   wherein the reaction member includes the reaction material of claim 1, the evaporator-condenser member condenses or evaporates water, the connecting member connects the reaction member and the evaporator-condenser member, and the opening-closing mechanism controls opening and closing of the connecting member.

* * * * *